United States Patent [19]

George et al.

[11] Patent Number: 4,956,809
[45] Date of Patent: Sep. 11, 1990

[54] METHOD FOR CANONICAL ORDERING OF BINARY DATA FOR PORTABLE OPERATING SYSTEMS

[75] Inventors: Johann George, Holland Landing, Canada; Trevor J. Thompson, New Providence, N.J.; David G. Conroy, Maynard, Mass.; Frederick H. Tudor, Evanston, Ill.

[73] Assignee: Mark Williams Company, Chicago, Ill.

[21] Appl. No.: 291,348

[22] Filed: Dec. 29, 1988

Related U.S. Application Data

[63] Continuation of Ser. No. 934,341, Nov. 24, 1986, abandoned, which is a continuation-in-part of Ser. No. 391,223, Jun. 23, 1982, abandoned.

[51] Int. Cl.$^5$ .............................................. G06F 9/00
[52] U.S. Cl. ................................ 364/900; 364/925.6; 364/931.1; 364/970; 364/955
[58] Field of Search ................................ 364/200, 900

[56] References Cited

U.S. PATENT DOCUMENTS

| | | |
|---|---|---|
| 4,079,451 | 3/1978 | Woods et al. |
| 4,109,310 | 8/1978 | England et al. |
| 4,301,505 | 11/1981 | Catiller et al. ........................ 364/200 |
| 4,491,908 | 1/1985 | Woods et al. ........................ 364/200 |

OTHER PUBLICATIONS

McGraw Hill Dictionary of Physics and Mathematics, ©1978, p. 124.
Portability of C Programs and the UNIX System, by S. C. Johnson and D. M. Ritchie, "The Bell System Technical Journal", vol. 57, No. 6, Jul.-Aug. 1978, pp. 2021-2048.
Von Nostrand's Scientific Encyclopedia, p. 274.
Sun Technical Report, "The Sun Network File System: Design, Implementation and Experience," pp. 1-16, copyright 1986 by Sun Microsystems, Inc.
Sun Technical Report, "Open Network Computing-Technical Overview," pp. 1-32, copyright 1987 by Sun Microsystems, Inc.

*Primary Examiner*—Gareth D. Shaw
*Assistant Examiner*—John G. Mills
*Attorney, Agent, or Firm*—Fish & Richardson

[57] ABSTRACT

A method for making files compatible between different computers having different binary structures while using the same operating system by keeping all files in a standardized canonical order when they move to or from external data storage or communication means. The method includes converting all binary data accessed from a file or communications channel from the canonical order to the natural order of the host computer before using the binary data in the host computer and converting all binary data which is to be sent to a file or communications channel from the natural order of the host computer to the canonical order before sending the binary data.

5 Claims, 3 Drawing Sheets

METHOD FOR CANONICAL ORDERING OF BINARY DATA FOR PORTABLE OPERATING SYSTEMS

This application is a continuation, of application Ser. No. 934,341, filed Nov. 24, 1986, which is itself a continuation-in-part of application Ser. No. 391,223, filed June 23, 1982, now abandoned.

BACKGROUND OF THE INVENTION

This invention relates to operating systems for digital computers and more particularly to a method for making files compatible between different digital computers having different binary structures but utilizing the same operating system.

There are many different digital computers available today. Indeed, it seems that the variety of different digital computers that are available is increasing and that there is little standardization of the architecture of the different digital computers. It is desirable for there to be compatibility between different digital computers at the level of the user's interaction with the computer, and hence there have emerged several operating systems which have been implemented on a number of different digital computer systems. These operating systems are refered to as "portable" operating systems and the process of implementing such a portable operating system on a new type of computer is refered to as "porting" or as "a port". The term "portable" will be used to refer to programs or data which can be used on more than one type of computer.

One such portable operating system is the UNIX operating system. UNIX is a trademark of Bell Labs. UNIX has been ported to a variety of very different computers, including mainframe IBM computers, minicomputers and microcomputers. Recently there have appeared several "UNIX like" operating systems which are compatible to one degree or another with UNIX at the user interface level, while their internal structure has been developed independently of the structure of the original UNIX. One such UNIX like operating system is COHERENT. COHERENT is a trademark of Mark Williams Company. This family of UNIX type operating systems, with the exception of COHERENT, has one feature which poses a serious portability problem, namely the incompatibility of files or file systems which have binary data within them if the source and destination computers have different binary structures.

One of the differences between computers is in the way binary data is structured. Binary data is data which is expressed as a binary or base two number, rather than being expressed in terms of an encoding of individual decimal digits, e.g. Binary Coded Decimal. The way this problem usually evidences itself is when groups of binary bits; for example bytes, each comprising eight bits; are combined to form larger binary quantities. When the groups of binary bits that are used by the computer are bytes of 8 bits, then the binary structure is refered to as a byte ordering, since the structure is fully described by the position of the bytes. As an example, let us consider a sixteen bit binary number stored in a computer which operates in bytes. Each sixteen bit number can be considered to be comprised of two bytes, a high order byte and a low order byte. There are many engineering considerations which determine the decision as to which order is chosen and the choice is not uniform from one computer to the next. The computer which is running an operating system will be refered to as the host computer and the binary structure of a particular computer will be refered to as its natural order. The natural order of the host computer determines the structure of binary data which is stored in the main memory of the host computer. In the prior art, the natural order of a computer also determined the binary structure for auxiliary memory files containing binary data, thereby making files and file systems incompatible between computers with different natural orders. A file system is a collection of files along with the directory information necessary to access the files. One particular example of a file containing binary data is an object file, which is a file created by a language translator, usually in the machine language of the host computer.

This incompatibility of files between different host computers has posed a serious problem in the prior art, as evidenced by the following quote from "The Bell System Technical Journal", VOL. 57, NO. 6, Part 2, July-August 1978, page 2039: "Another class of problems seems impossible to avoid, since it stems from the basic differences in the representation of information on the two machines. . . . Since all the interfaces between the two machines are byte-serial, the effect is best described by saying that when a true character stream is transmitted between them, all is well; but if intergers are sent, the bytes in each half-word must be swapped. Notice that this problem . . . complicates "protability" in its root meaning wherein files are carried from one machine to the other."

The following additional quote from p. 212 of "The C Programming Language" by Brian W. Kernighan and Dennis M. Ritchie, Prentice Hall, Inc., 1978, is further evidence of the nature of the problem in the prior art: "Purely hardware issues like word size and the properties of floating point arithmetic and integer division have proven in practice to be not much of a problem. Other facets of the hardware are reflected in differing implementations. Some of these, particularly sign extension (converting a negative character into a negative integer) and the order in which bytes are placed in a word, are a nuisance that must be carefully watched. Most of the others are only minor problems."

The problem of incompatibility of files between different host computers has been handled in the prior art by designing a conversion program to convert files from one natural order to another when it is necessary to transport files between different computer systems. This method is unsatisfactory because it introduces one additional decision and manual step into the process of transporting files, which can result in confusion and mistakes. This method is also unsatisfactory because it requires the writing of a different program for each different combination of computers between which files are to be transported.

One prior art method of transporting files from one computer system to another computer system with a different natural order can be better understood by looking at FIG. 1, which shows a computer A, 110, a computer B, 120, a computer C, 130, and an auxiliary memory, 140. A FILE1, 111, resides in the memory of Computer A, 110, in the natural order of Computer A, 110. When FILE1, 111, is written to Auxiliary Memory, 140, as FILE1, 141, it is in the same natural order of Computer A, 110. Similarly there is a FILE2, 121, in Computer B, 120, and a corresponding FILE2, 142, in Auxiliary Memory, 140, both in the natural order of Computer B, 120. There is also a FILE3, 131, in Computer C, 130, and a corresonding FILE3, 143, in Auxiliary Memory, 140, both in the natural order of Computer C, 130. In order to use this prior art method is necessary to have a conversion program in each computer system for converting from the natural order of every other possible computer system. In general, with n computer systems with different natural orders, it is necessary to have n times (n−1) such conversion programs. In addition to the necessity of having all of these conversion programs, it is necessary to keep track of what order each file is written in and to manually select the appropriate conversion program. It often occurs that little used conversion programs are not easily available when needed which can cause major problems with data transfer by this method.

It is an object of this invention to provide a method for using a canonical ordering of binary data to make files compatible between different host computers with different natural orders.

SUMMARY OF THE INVENTION

In accordance with the present invention, a method for making files portable between different host computers running the same operating system but having different natural orders comprises the steps of converting all binary data read from a data source from a canonical order to the natural order of the host computer prior to using the binary data in the host computer, and converting all binary data sent to a data destination from the natural order of the host computer to a canonical order after it is last used by the host computer and before it is sent to the data destination.

BRIEF DESCRIPTION OF THE DRAWING

A Method for Canonical Ordering of Binary Data for Portable Operating Systems according to this invention will be better understood from a consideration of the detailed description of the organization and operation of one illustrative embodiment thereof which follows when taken in conjunction with the accompanying drawing, in which.

DETAILED DESCRIPTION

Table of Contents

1. Definitions
2. Introduction to the Example
3. Program 1—PDP 11 Canonical Conversion
4. Program 2—8086 Canonical Conversion
5. Program 3—Z8000 Canonical Conversion
6. Illustrative Operation

1. Definitions

PORTABLE OPERATING SYSTEM—An operating system which has been implemented on a number of different digital computer systems.

PORTABLE—Used to refer to programs or data which can be used on more than one type of computer.

"UNIX like" operating system—An operating system which is compatible to one degree or another with the UNIX Operating System at the user interface level, while its internal structure has been developed independently of the structure of the original UNIX.

BINARY DATA—Data which is expressed as a binary or base two number, rather than being expressed in terms of an encoding of individual decimal digits, e.g. Binary Coded Decimal.

BINARY STRUCTURE—The order in which binary bits are arranged within a word in main memory of a certain computer system. The binary structure is dependent upon the architecture of the certain computer system.

BYTE ORDERING—When the groups of binary bits that are used by a certain computer are bytes of 8 bits, then the binary structure is refered to as a byte ordering, since the structure is fully described by the position of the bytes within a word in memory of the certain computer.

HOST COMPUTER—The computer which is running an operating system.

NATURAL ORDER—The binary structure of a particular computer.

FILE SYSTEM—A collection of files along with the directory information necessary to access the files.

OBJECT FILE—A file created by a language translator, containing a representation of the output of the language translator, which is usually in the machine language of the host computer.

CANONICAL ORDER—A binary structure which is chosen as the standard binary structure for representation of files stored on auxiliary memory or transported on a communication channel.

AUXILIARY MEMORY—Memory in a computer system other than the main memory of the computer, usually disk drives or tapes. Auxiliary memory is often used for long term storage of data or as a means for transporting data from one computer system to another.

2. Introduction to the Example

Figure 2:
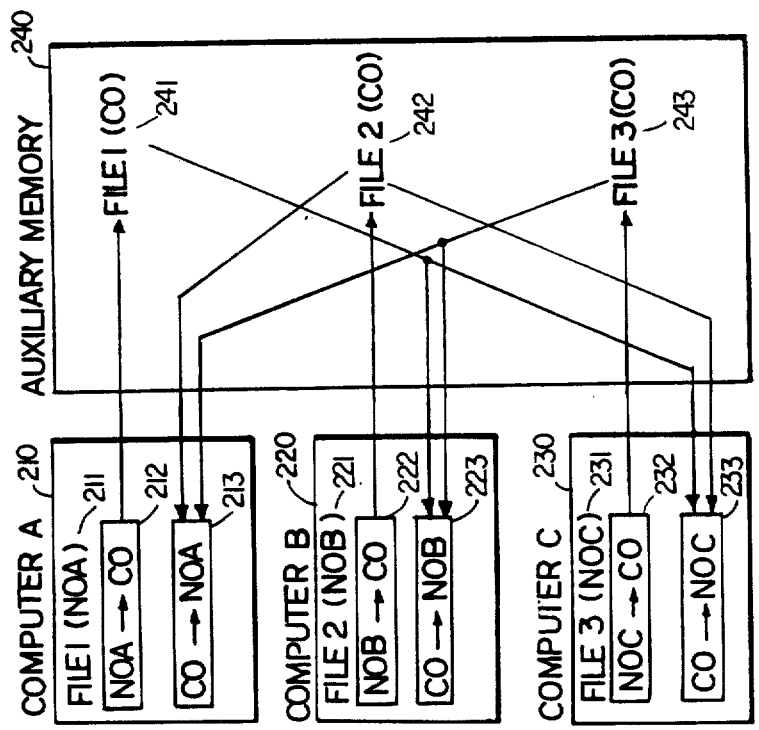
FIG. 2 depicts a data conversion method according to this invention.

One illustrative use of a method for canonical ordering of binary data for portable operating systems according to the invention can be understood by refering to FIG. 2 comprising a computer A., 210, a computer B, 220, a computer C, 230, and an auxiliary memory, 240. A FILE1, 211, resides in the memory of Computer A, 210, in the natural order of Computer A, 210. Before FILE1, 211, is written to Auxiliary Memory, 240, as FILE1, 241, it is converted to canonical order by means of a program, 212, which converts a file from the natural order of A to canonical order. Similarly before FILE2, 221, is written to Auxiliary Memory, 240, as FILE2, 242, it is converted to canonical order by means of a program, 222, which converts a file from the natural order of B to canonical order. Also, before FILE3, 231, is written to Auxiliary Memory, 240, as FILE3, 243, it is converted to canonical order by means of a program, 232, which converts a file from the natural order of C to canonical order. In general, with n computer systems with different natural orders, it is only necessary to have n times 2 such conversion programs. In the prior art it is necessary to have n times (n−1) conversion programs, which for any large number of computer systems becomes a large number of conversion programs. Using this invention it is not necessity to keep track manually of whether or not it is necessary to run these conversion programs as it is with the prior art method. In this invention the conversion programs are always run to convert to and from canonical order, which eliminates manual record keeping and decision making and reduces the number of mistakes made, as well as being sure that all files on auxiliary memory can be used on any computer system.

Figure 1:
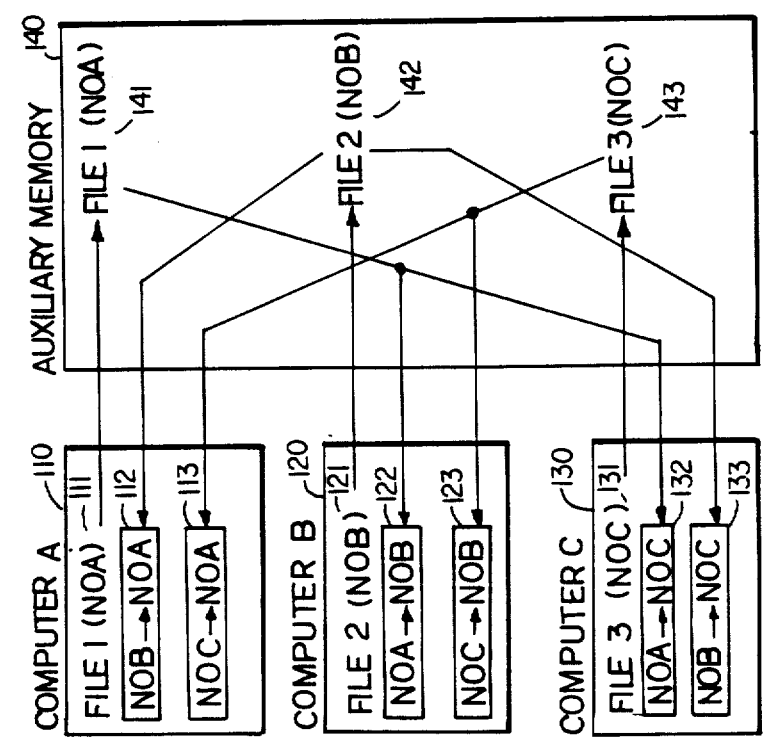
FIG. 1 depicts a prior art data conversion method.
Figure 3:
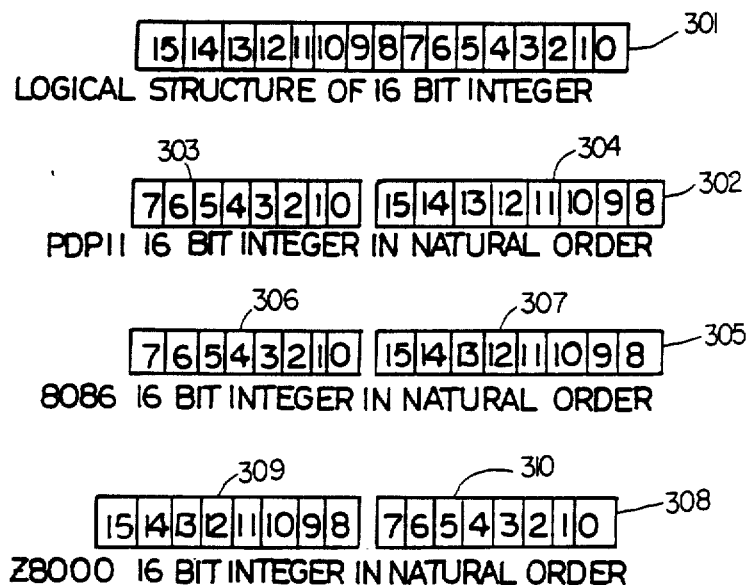
FIG. 3 depicts an exemplary 16 bit binary structure of three host computers used as examples.

FIG. 3 comprises a diagram of the binary structure of 16 bit integers as implemented in three well known computers: the PDP-11 by Digital Equipment Corporation, the 8086 by Intel Corporation, and the Z8000 by Zilog Incorporated. The PDP 11 is described in "PDP 11 processor handbook", Digital Equipment Corporation, 1981. The 8086 computer is described in "MCS-86 USER'S MANUAL", Intel Corporation, February 1979. The Z8000 computer is described in "Z8000 PLZ/ASM Assembly Language Programming Manual", Zilog Inc., Revision A, April 1979. This specific example of the PDP-11, 8086 and Z8000, correspond to Computer a, Computer B and Computer C in FIG. 1, FIG. 2 and FIG. 7.

FIG. 3 comprises a diagram 301 showing the logical structure of a 16 bit integer. The 16 bits comprising the integer are labeled from 0 through 15, where the 0 bit is the least significant and the 15th bit is the most significant.

FIG. 3 further comprises a diagram 302 showing the natural order of a 16 bit integer in a PDP-11 computer. Diagram 302 is comprised of two bytes, 303 and 304, being the first and second bytes thereof. The first byte, 303, has an address in memory which is one less than the second byte, 304. The bits in bytes 303 and 304 are labeled from 0 through 15 to correspond with the same bits in the logical structure, 301. It should be noted that the two bytes, 303 and 304, are reversed with respect to the logical structure, 301. The PDP-11 structure as shown in 302 is chosen in this example as the standard or canonical order. Since the UNIX operating system was primarily developed and implemented on PDP-11 computers it is natural to choose the PDP-11 binary structure as the canonical structure.

Diagram 305 shows the natural order of a 16 bit integer in the 8086 computer. Diagram 302 is comprised of two bytes, 306 and 307, being the first and second respectively. The bits in bytes 306 and 307 are labeled from 0 through 15 to correspond with the same bits in the logical structure, 301. It should be noted that the two bytes, 306 and 307 are reversed with respect to the logical structure, 301, and are therefore the same as the PDP-11 structure shown in 302.

Diagram 308 shows the natural order of a 16 bit integer in the Z8000 computer. Diagram 308 is comprised of two bytes, 309 and 310, being the first and second respectively. The bits in bytes 309 and 310 are labeled from 0 through 15 to correspond with the same bits in the logical structure, 301. It should be noted that the two bytes, 309 and 310 are not reversed with respect to the logical structure, 301, as the PDP-11 and 8086 are.

The problem posed by the different natural orders of the three computers above was discussed in the background section, namely that if a portable operating system is implemented on each of the above computers and if it is desired to put data files on auxiliary memory, usually tape or disk, or to put data on a communications channel to another computer of a different type, then some method must be used to overcome the incompatibility of the binary structures involved. Auxiliary memory such as tape or disk, or a communication channel will be refered to as a data source if the host computer is reading data from it, or a data destination if data is being written to it. In the prior art data conversion programs were written, but these proved unsatisfactory for a number of reasons discussed in the background section. The method of this invention requires the design of functions that will convert binary structures from natural order to canonical order and also from canonical order to natural order. Every time binary data is read from a data source it must be converted from canonical order to natural order immediately after reading it by calling the canonical conversion function for each such piece of binary data. Every time binary data is written to a data destination it must be converted to canonical order just before writing it.

An example of the use of the method of this invention will now be presented in order to fully teach the use of the method. This example will demonstrate the use of the method of this invention to convert from canonical order to natural order when binary data is read from a disk. This example is written in the C language, as defined in the well known text by Brian W. Kernighan and Dennis M. Ritchie, "The C Programming Language", Prentice Hall, 1978. The invention is not limited to the C language or to this particular example. Many other languages and programs could be used as examples.

3. Program 1

Figures 4, 5, 6:
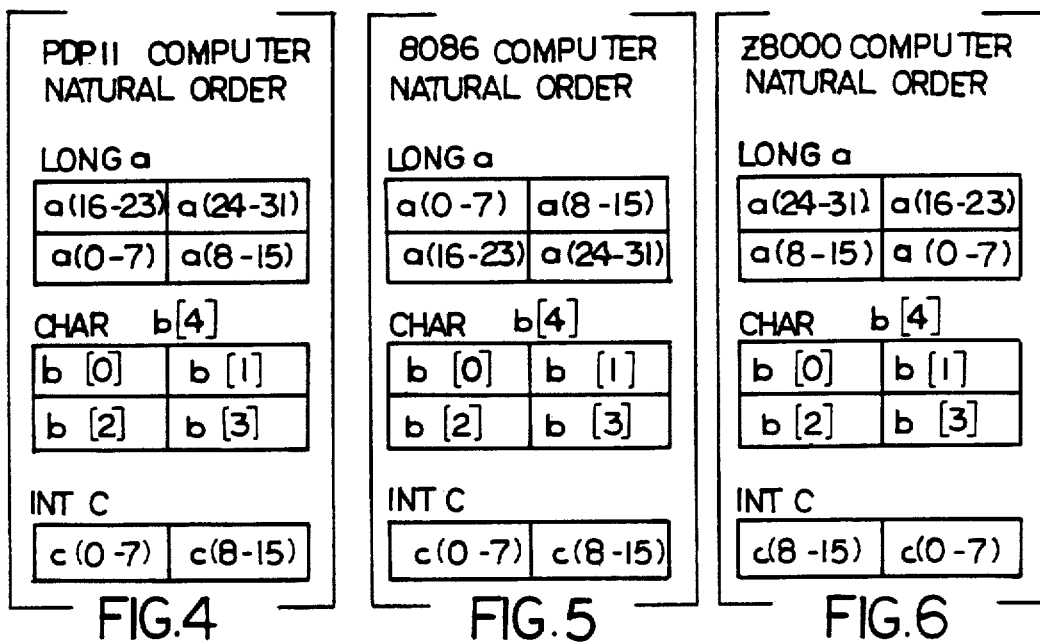
FIG. 4 depicts the natural order of the PDP 11 computer.
FIG. 5 depicts the natural order of the 8086 computer.
FIG. 6 depicts the natural order of the Z8000 computer.

Program 1, which follows, comprises the canonical conversion routines for the PDP 11. These conversion routines are reversible, i.e. they will perform conversion from natural order to canonical order or from canonical order to natural order depending upon the order of the input data. FIG. 4 displays the natural order of the PDP 11. It should be noted that both the routines for long 32 bit and short 16 bit integers are null, i.e. no function is performed. The reason for this is that the canonical order is the same as the PDP 11 natural order in this example.

```
/*
 *              PROGRAM 1
 *      Canonical conversion routines for the PDP 11
 */             computer.
/*
 *      No conversion is necessary between natural order
 *      and canonical
 *      order for 16 bit short integers as the natural order is
 *      the same
 *      as the canonical order.
 */
canint(p)
int *p
{
}
/*
 *      No conversion is necessary between natural order
 *      and canonical
 *      order for 32 bit long integers as the natural order is
 *      the same
 *      as the canonical order.
 */
canlong(p)
long *p;
{
```

-continued
```
}
```

4. Program 2

Program 2 comprises the canonical conversion routines for the 8086 computer. These conversion routines are reversible, i.e. they will perform conversion from natural order to canonical order or from canonical order to natural order depending upon the order of the input data. FIG. 5 displays the natural order of the 8086. While 8086 short 16 bit integers are the same as the canonical order and therefore the conversion routine is null, 8086 long 32 bit integers are formatted differently and so there is a routine that changes the format.

```
/*
 *          PROGRAM 2
 *     Canonical conversion routines for the Intel 8086
 *     computer
 */
/*
 *     No conversion is necessary between natural order
 *     and canonical
 *     order for 16 bit short integers as the natural order is
 *     the same
 *     as the canonical order.
 */
canint(p)
int *p
{
}
/*
 *     Since the 8086 computer stores 32 bit long integers
 *     with the
 *     low order 16 bit word first and the canonical
 *     standard defines
 *     the high order 16 bit word to be first, the two 16 bit
 *     words are
 *     swapped. We have a byte ordering of:
 *     [a][b][c][d]
 *     and would like a byte ordering of:
 *     [c][d][a][b]
 */
canlong(p)
long *p;
{
    int i16;
    int *p16;
    p16 = (int *)p;     /* p16 is a pointer to a short int */
                        /* at same location as the long */
    i16 = p16[0];       /* save the high half in i16 */
    p16[0] = p16[1];    /* put low half in high half */
    p16[1] = i16;       /* put old high half in low half */
}
```

5. Program 3

Program 3 comprises the canonical conversion routines for the Z800 computer. These conversion routines are reversible, i.e. they will perform conversion from natural order to canonical order or from canonical order to natural order depending upon the order of the input data. FIG. 6 displays the natural order of the z8000. Since both long 32 bit and short 16 bit integers are different for the Z8000 than the canonical order, there are conversion routines for both.

```
/*
 *          PROGRAM 3
 *     Canonical conversion routines for the Z8000
 */
/*
 *     The Z8000 computer stores 16 bit short integers with
 *     the bytes
 *     reversed from canonical standard, and therefore
 *     bytes
 *     need to be reversed. We have a byte ordering of:
 *     [a][b]
 *     and would like:
 *     [b][a]
 */
canint(p)
int *p
{
    char c8;
    char *p8;
    p8 = (char *)p;
    c8 = p8[0];
    p8[0] = p8[1];
    p8[1] = c8;
}
/*
 *     The 16 bit word ordering of 32 bit long integers on
 *     the Z8000
 *     is exactly the same as the canonical standard, but the
 *     bytes in
 *     each 16 bit word must be reversed. We have a byte
 *     ordering of:
 *     [a][b][c][d]
 *     and would like an ordering of:
 *     [b][a][d][c]
 */
canlong(p)
long *p;
{
    char c8;
    char *p8;
    p8 = (char *)p;
    c8 = p8[0];
    p8[0] = p8[1];
    p8[1] = c8;
    c8 = p8[2];
    p8[2] = p8[3];
    p8[3] = c8;
}
```

6. Illustrative Operation

Figure 7:
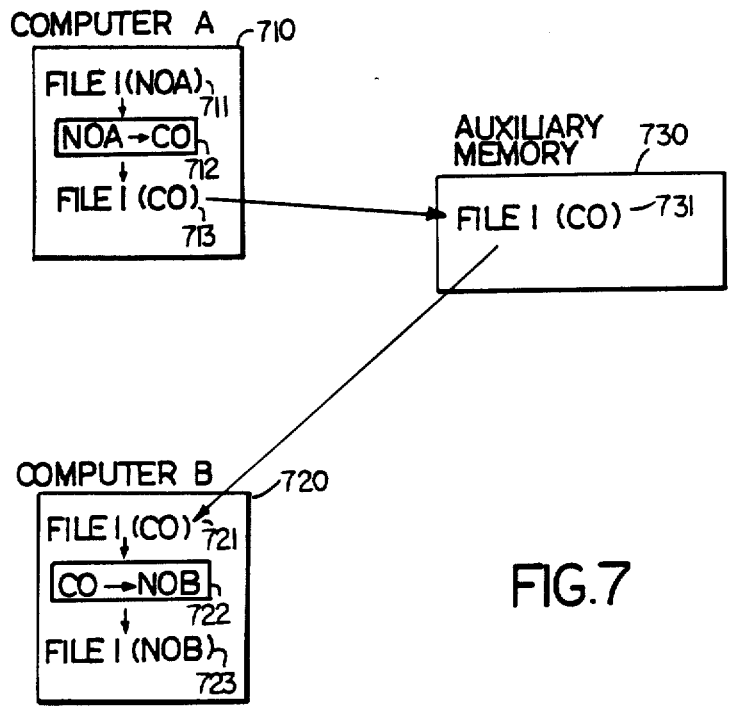
FIG. 7 depicts the operation of the method according to this invention in the example described.

One illustrative operation may be understood by refering to FIG. 7, which shows the use of the invention to write a version of FILE1, 731, in canonical order to an auxiliary memory, 730, from a computer system A, 710, and later to read the FILE1, 731, to a Computer B, 720. There exists a copy of FILE1, 711, in the natural order of Computer A, 710, in the memory of Computer A, 710, as well as a program, 712, for use in converting files from the natural order of Computer A, 710 to the canonical order. There also exists a program, 722, in the memory of Computer B, 720, for use in converting files from the canonical order to the natural order of Computer B, 720.

The illustrative operation proceeds according to the following steps. First, FILE1, 711, is converted to a FILE1, 713, in canonical order in the memory of Computer A, 710, by means of program 712. Program 712 proceeds by reading each byte of FILE1, 711, calling the appropriate conversion routines, for example PROGRAM 1 as described above, and writing each converted byte to FILE1, 713, which is now in canonical order. Next, FILE1, 713, is written to Auxiliary Memory, 730, as FILE1, 731. Next, at some later time when it is desirable to access FILE1, 731, in Computer B, 720, FILE1, 731 is read into Computer B, 720, as FILE1, 721, in canonical order. Next program 722 is used to convert FILE1, 721, in canonical order, into FILE1, 723, in the natural order of computer system B, 720.

It is often desirable to use the method of this invention with a file, only some of which is to be converted to canonical order, for example a file which is itself an entire file system. In the case of a file system, the directory information, which comprises an essential part of the file system, is usually a complex combination of binary and non binary information.

What has been described is considered to be only a specific illustrative embodiment of the invention and it is to be understood that various other arrangements may be devised by one skilled in the art without departing from the spirit and scope thereof as defined by the accompanying claims.

We claim:

1. A method for use with a portable operating system used on different computers which use different binary structures, whereby files containing binary data become portable, comprising the steps of:

by means of a computer, representing in a standardized order consisting of a standard binary structure files stored on auxiliary memory or transported on a communications means, said standardized order being different from a natural order used on at least one of the different computers;

converting in each of the different computers binary data read from auxiliary data storage or communications means from the standardized order to the natural order of the respective host computer after said binary data are read from said auxiliary data storage or communications means and before said binary data are used by the respective host computer; and converting in each of the different computers binary data written into auxiliary data storage or communications means from the natural order of the respective host computer to the standardized order prior to said writing.

2. A method according to claim 1, wherein said operating system comprises a UNIX like operating system.

3. A method according to claim 1, wherein said file comprises a file system and some or all of said binary data is converted.

4. A method according to claim 1, wherein said file comprises an object file expressed in binary.

5. A method for use on different computers which use different binary structures, whereby files containing binary data become portable between the computers, comprising the steps of:

representing by means of a computer files that are stored for use by one or more of the computers or are transported on a communications means to one or more of the computers, in a predetermined binary structure different than the binary structure used on at least one of the different computers;

converting in each of the computers binary data, to be stored for use by one or more of the computers or to be transported on said communications means to one or more of the computers, from the binary structure of the originating computer to the predetermined binary structure, and converting in each of the computers binary data obtained from said stored files or from said communications means from said predetermined binary structure to the binary structure used by said computer.

* * * * *